United States Patent [19]

Starke

[11] 4,418,716
[45] Dec. 6, 1983

[54] TWO-WAY FLOW VALVE

[75] Inventor: Roy R. Starke, Lake Park, Fla.

[73] Assignee: The United States of America as represented by the Secretary of the Air Force, Washington, D.C.

[21] Appl. No.: 291,863

[22] Filed: Aug. 10, 1981

[51] Int. Cl.³ .............................................. F16K 11/00
[52] U.S. Cl. .................... 137/605; 137/269; 137/800; 137/881
[58] Field of Search ...................... 137/269, 596.1, 605, 137/625.4, 798, 800, 871, 881; 251/149.6; 285/12, DIG. 2

[56] References Cited

U.S. PATENT DOCUMENTS

| | | | |
|---|---|---|---|
| 2,177,278 | 10/1939 | Hill et al. | 251/149.6 |
| 3,219,325 | 11/1965 | Brown | 261/159 |
| 3,561,481 | 2/1971 | Taplin | 137/625.4 |
| 3,608,570 | 9/1971 | McKhann et al. | 251/149.6 X |
| 4,060,219 | 11/1977 | Crawford | 251/149.6 |
| 4,129,147 | 12/1978 | Stoll et al. | 137/596.1 |

FOREIGN PATENT DOCUMENTS

| | | | |
|---|---|---|---|
| 357046 | 2/1938 | Italy | 137/881 |
| 466761 | 6/1937 | United Kingdom | 137/596.1 |

Primary Examiner—Gerald A. Michalsky
Attorney, Agent, or Firm—Donald J. Singer; John R. Flanagan

[57] ABSTRACT

A two-way flow valve includes a valve body having a cavity and a stem longitudinally moveable therein which establishes two separate fluid flow paths through the cavity in the body from first and second inlet ports to a common outlet port. A spring biases the stem to a first position in which fluid flow is allowed along a first one of the paths and obstructed along the other. When a closure is applied to the valve, the stem is moved against the spring bias to a second position in which fluid flow is allowed along a second one of the paths and obstructed along the first path.

3 Claims, 2 Drawing Figures

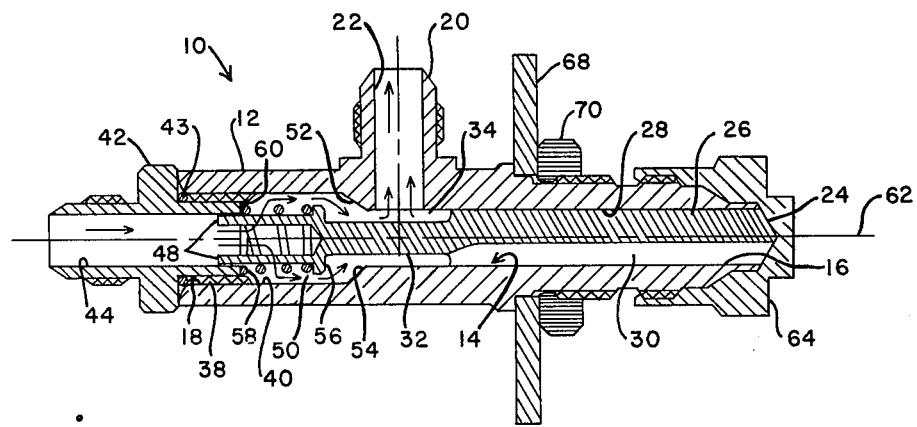
Fig. 2
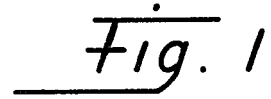
Fig. 1
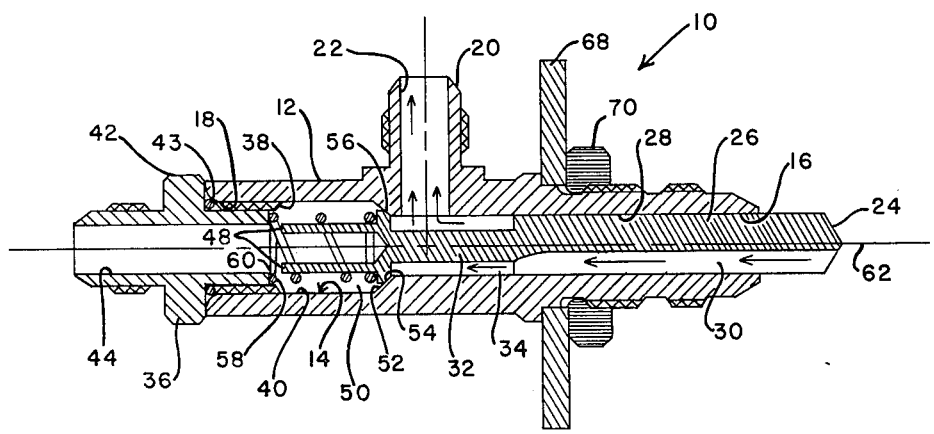

TWO-WAY FLOW VALVE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly related to a flow valve and, more particularly, is concerned with a flow valve which provides two alternate paths along which to establish fluid flow through the valve.

2. Description of the Prior Art

In each of the F-15 and F-16 aircraft, there is an onboard engine-mounted computer for controlling operation of the jet engine. The electronic components of the computer are cooled by circulating aircraft engine fuel as a coolant through heat transfer structures associated with the components.

However, because of other factors, these two aircraft must obtain coolant fuel for the electronic components of the engine-mounted computer from two different sources. Specifically, on the F-15 these components are cooled by fuel received directly from the engine fuel pump, while on the F-16 the coolant fuel is obtained from the air frame fuel feed line before it reaches the engine fuel pump.

Because construction of aircraft involves high precision fabrication and assembly of literally thousands of parts, there is an overriding desire to design as many common parts as possible for different types of aircraft. These common parts must be able to serve the specific requirements of each application while accommodating any variations or differences between them.

SUMMARY OF THE INVENTION

The present invention is directed to a two-way flow valve having a design which will serve the needs of both types of aforementioned aircraft in the area of supplying coolant fuel to the electronic components of their respective engine-mounted computers. The principal accomplishment of this valve is its capability of supplying coolant fuel from two different sources on the respective aircraft without requiring the addition or subtraction of parts other than a standard flight closure cap which, due to its use in a variety of places on the aircraft, is readily available.

Furthermore, the valve of the present invention does not require manual activation to select between the alternate flow sources. Instead, when the valve is installed in an engine, such as that of the F-15 aircraft, with a flight closure installed on one end of the valve body, a stem in the valve is positioned such that flow of coolant fuel will be directed from the main fuel pump inlet port of the valve through the valve body to the electronic component outlet port of the valve. On the other hand, when the flight closure is removed, such as when the valve is applied to the F-16 aircraft engine, a spring biases the valve stem such that the flow path from the main fuel pump inlet port of the valve is blocked and, instead, coolant fuel is now allowed to flow through the valve body along an alternate path to the same electronic component outlet port thereof from the air frame inlet port of the valve.

BRIEF DESCRIPTION OF THE DRAWINGS

FIG. 1 is a side elevational view of the two-way flow valve of the present invention is seen along a vertical cross-sectional plane taken through the longitudinal axis of the valve, showing the condition of the valve for fluid flow therethrough along a first flow path.

FIG. 2 is a view similar to that of FIG. 1, but showing the condition of the valve for fluid flow therethrough along a second flow path.

DETAILED DESCRIPTION OF THE INVENTION

Referring now to FIGS. 1 and 2, there is shown the preferred embodiment of the two-way flow valve of the present invention, being generally designated 10. The valve 10 includes a generally hollow valve body 12 defining a generally cylindrical cavity 14 open at its opposite ends 16, 18. The body has an externally threaded nozzle 20 located intermediate the ends of its cavity and defining an outlet port 22 therefrom. A valve stem 24 is mounted within the cavity 14 for longitudinal sliding movement relative to the valve body 12 and adjacent the outlet port 20 from the cavity. The stem 24 has a body portion 26 which is generally cylindrical in shape and mounts the valve stem 24 within the valve body 12 by establishing sliding engagement with a first cylindrical surface portion 28 of the cavity 14 extending from the outlet port 22 to the one end 16 of the cavity. A longitudinally-extending segment of the stem body portion 26 is cut away so as to define a first inlet port 30 at the one end 16 of the cavity 14. Merging from the body portion 26 of the stem 24 is a recessed neck portion 32 which is located adjacent the outlet port 22 and together with the valve body 12 defines therebetween and about the neck portion 32 a first annular passageway 34 which establishes a first fluid flow path (see the arrows in FIG. 1) through the first inlet port 30 to the outlet port 22.

At the other end 18 of the valve body cavity 14 is attached means in the form of an externally threaded connector adapter 36. The adapter 36 is threaded onto threads 38 on the other end of a second cylindrical surface portion 40 of the cavity 14 until an annular flange 42 on the adapter 36 abuts the end of the valve body 12. An O-ring seal 43 is provided between the flange 42 and the valve body. The adapter 36 has a central bore through it which defines a second inlet port 44 at the other cavity end 18.

A portion of the stem 24 which merges from the recessed neck portion 32 thereof has a bifurcated configuration being formed by a pair of parallel, longitudinally-extending tabs 48. This portion of the stem together with the second surface portion 40 of the valve body 12 define therebetween a second passageway 50 which communicates the second inlet port 44 with the first passageway 34 and thereby establishes a second fluid flow path (see the arrow in FIG. 2) through the second inlet port 44 to the outlet port 22.

The second cylindrical surface portion 40 of the cavity 14 is larger in diameter than the first cylindrical surface portion 28 thereof. At the location where the first and second passageways 34 and 50 meet, there is a tapered or conical surface portion 52 which forms a transition from the first to second cylindrical surface portions 28 and 40. An inner part of the conical surface portion 52 comprises an annular valve base 54 which is aligned with an annular valve element 56 defined on the stem 24 at the location of connection of the tabs 48 with the neck portion 32 of the stem. By becoming seated upon, and unseated from, the valve base 54, the valve element blocks and unblocks the communication of the second passageway 50 with the first passageway 34.

For biasing the stem 24 to move toward a first position, as seen in FIG. 1, in which the valve element 56 seats on valve base 54, there is provided means in the form of spring 58 being confined between the inner end surface 60 of the adapter 36 and the opposite side of the valve element 56 from the side thereof engaged with the valve base 54. The tabs 48 are spaced apart by a distance less than the diameter of the bore in the adapter 36 so as to be capable of fitting within the bore as the stem 24 slides longitudinally within the valve body cavity 14 along axis 62 thereof. The spring 58 encircles and is maintained between the adapter and valve element by the tabs 48 as the spring moves between its expanded and compressed conditions shown in FIGS. 1 and 2 respectively.

When the stem 24 is located in its first position with the valve element 56 seated on the valve base 54, communication between the first and second passageways 34, 50 is blocked and, therefore, fluid flow is obstructed along the second flow path. However, there is no interference with fluid flow along the first flow path, as seen in FIG. 1.

For closing the first inlet port 30 and thereby obstructing fluid flow along the first flow path, means in the form of a closure 64 is threadably inserted on the valve body 12 at the one end 16 of the cavity 14. Insertion of the closure 64 forces the valve stem 24 to move along the longitudinal axis 62 of cavity 14 to a second, opposite position, as seen in FIG. 2, against the biasing force of the spring 58. This movement unseats the valve element 56 from the valve base 54 which unblocks communication of the second passageway 50 with the first passageway 34 and thereby allows fluid flow along the second flow path, as seen in FIG. 2.

When the flow valve 10 is applied to the F-16 aircraft, the closure 64 is removed. The stem 24 is then located in its first position and coolant fuel is received from the aircraft air frame and routed through the first inlet port 30 along the first flow path of FIG. 1 to the electronic components (not shown) via the valve outlet port 22. On the other hand, when the valve is applied to the F-15 aircraft, the closure 64 is inserted on the valve. The stem 24 is then disposed at its second position, and coolant fuel is received from the engine main fuel pump and routed through the second inlet port 44 along the second flow path of FIG. 2 to the electronic components (not shown) via the valve outlet port 22. In either case the valve is mounted to a mounting bracket 68 by a retaining nut 70 such as seen in both FIGS. 1 and 2.

It can be seen that no additional parts are required to change between coolant fuel supply sources. Therefore, the need for changeover kits or additional parts on the air frame is eliminated. Also, the automatic switching of the valve position when the flight closure is removed eliminates the need to devise some foolproof method of installing the air frame fuel supply hose. An alternative construction to the use of the flight closure could consist of some type of quick disconnect feature on the air frame fuel supply port, or the first inlet port herein.

It is thought that the two-way flow valve of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A two-way flow valve, comprising:
   (a) a generally hollow valve body having first and second internal cylindrical surface portions defining a cavity open at both ends and an outlet port from said cavity located intermediate its ends, said first cylindrical surface portion extending from said outlet port to one end of said cavity;
   (b) a valve stem having a body portion which is generally cylindrical in shape and movably mounted within said cavity for longitudinal sliding engagement with said first cylindrical surface portion of said valve body, said stem body portion having a longitudinally-extending segment thereof which is cut away so as to define a first inlet port at one of said cavity ends, said valve stem also having a recessed neck portion merging from said body portion and located adjacent said outlet port in said valve body, said recessed neck portion of said valve stem and said first cylindrical surface portion of said valve body together defining therebetween a first fluid flow path through said first inlet port to said outlet port;
   (c) means defining a second inlet port at the other of said cavity ends;
   (d) said valve stem further having a pair of parallel, longitudinally-extending tabs merging from said recessed neck portion to adjacent said second inlet port, said tabs of said stem and said second cylindrical surface portion of said valve body together defining therebetween a second fluid flow path through said second inlet port to said outlet port;
   (e) means encircling said tabs of said valve stem and mounted within said valve body cavity for biasing said stem to move toward a first position in which said fluid flow along said second flow path is obstructed, while fluid flow along said first flow path is allowed; and
   (f) means for closing said first inlet port and thereby obstructing fluid flow along said first flow path, said means when closing said first inlet port also causing said stem to move to a second position against said biasing means in which fluid flow along said second path is allowed.

2. The two-way flow valve as recited in claim 1, wherein:
   said first cylindrical surface portion of said valve body is smaller in diameter than said second cylindrical surface portion of said body;
   said valve body further has an internal tapered surface portion which forms a transition from said first to said second cylindrical surface portions, said tapered surface portion comprising an annular valve base;
   said valve stem at said location of merger of said tabs with said recessed neck portion of said stem has an annular valve element aligned with said annular valve base of said valve body such that said valve element seats on said valve base so as to obstruct flow along said second flow path when said valve stem moves to said first position; whereas said valve element unseats from said valve base and leaves said second flow path unobstructed when said stem is moved to said second position.

3. The two-way flow valve as recited in claim 1, wherein said biasing means is a spring and said tabs of said stem have a bifurcated structure for mounting said spring in a position for biasing said stem toward said first position.

* * * * *